C. COTTA.
CHANGE SPEED GEARING.
APPLICATION FILED JUNE 20, 1910.

986,444.

Patented Mar. 14, 1911.
2 SHEETS—SHEET 1.

Witnesses
E. Larson
M. J. Taylor

Inventor
Charles Cotta
By G. L. Beeler
Attorney

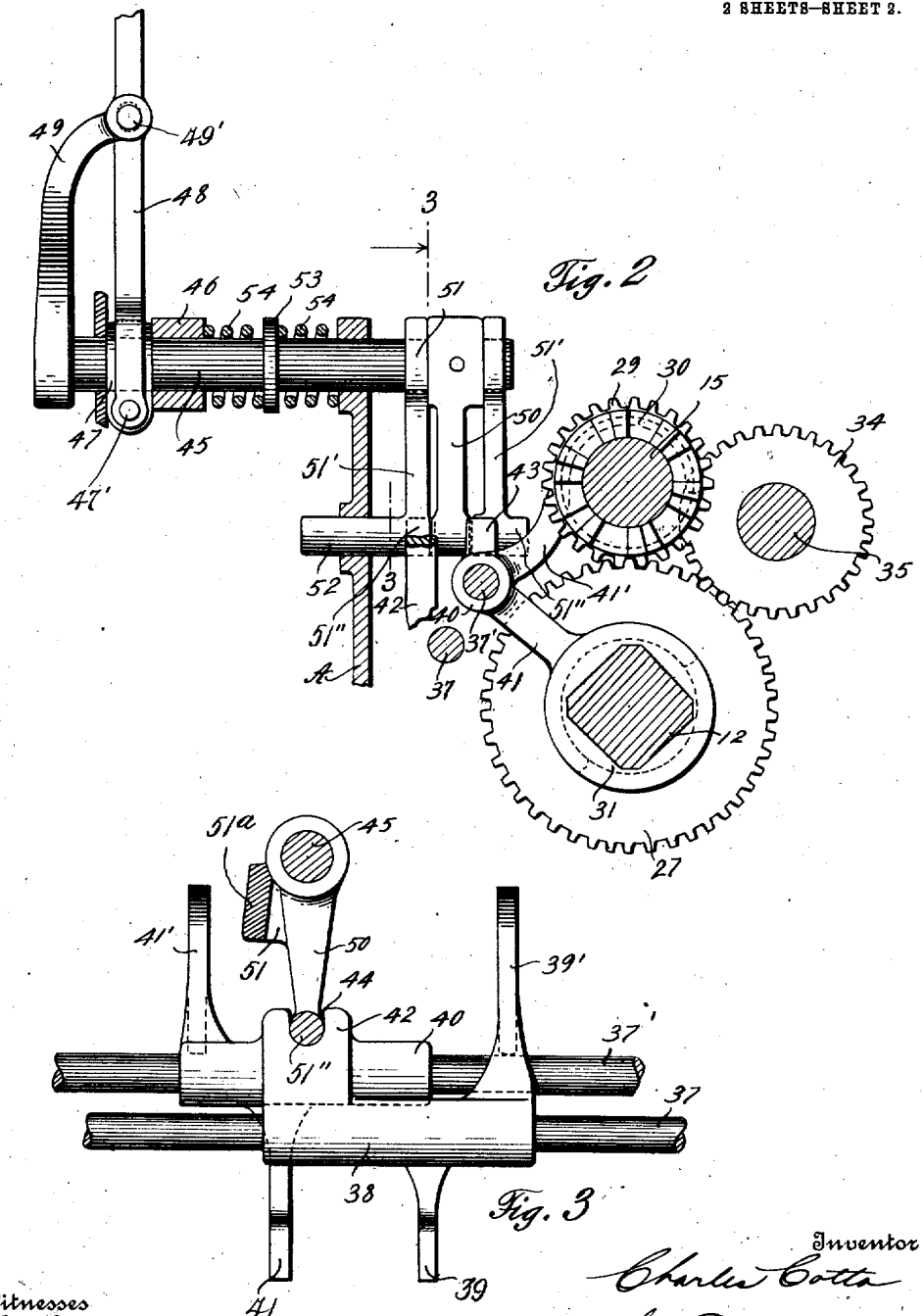

UNITED STATES PATENT OFFICE.

CHARLES COTTA, OF ROCKFORD, ILLINOIS.

CHANGE-SPEED GEARING.

986,444.  Specification of Letters Patent. Patented Mar. 14, 1911.

Application filed June 20, 1910. Serial No. 567,944.

*To all whom it may concern:*

Be it known that I, CHARLES COTTA, a citizen of the United States, residing at Rockford, in the county of Winnebago and State of Illinois, have invented a new and useful Change-Speed Gearing, of which the following is a specification.

This invention relates to transmission mechanism for motor vehicles and other machinery where a change speed gearing is desired, and the invention consists in the peculiar details of construction hereinafter fully described and claimed, and illustrated in the accompanying drawings, in which—

Figure 1:
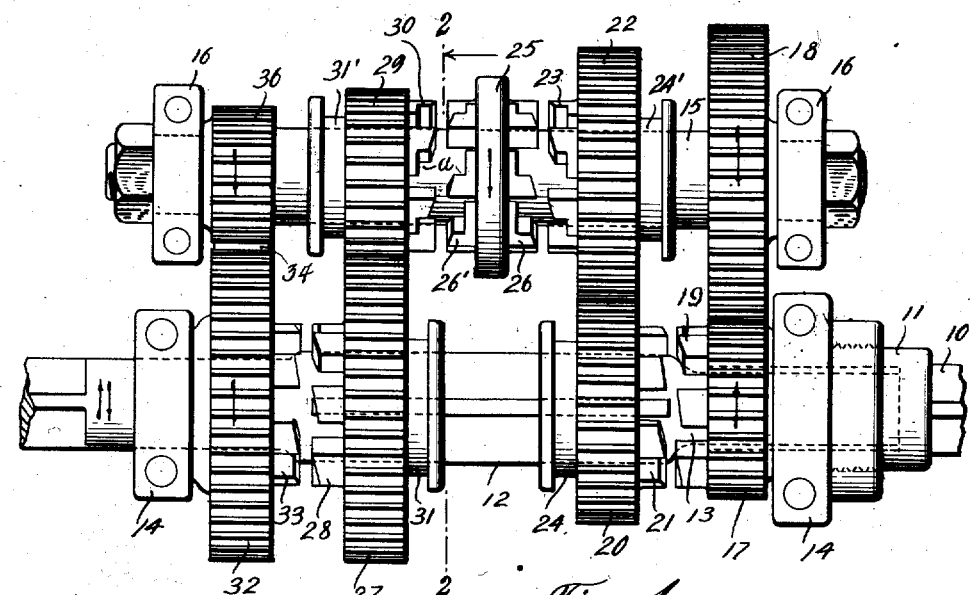
Figure 4:
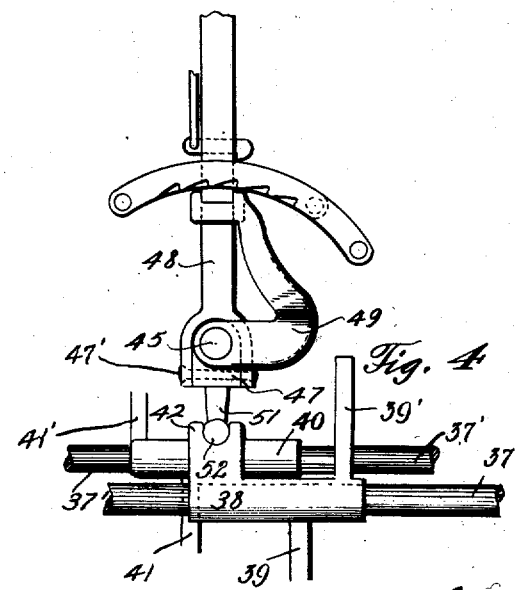

Figure 1 is a face view of the variable speed gears and clutches; Fig. 2 is a transverse section substantially on the line 2—2 of Fig. 1, showing additional related parts; Fig. 3 is a detail of the shifting mechanism substantially on the line 3—3 of Fig. 2, and Fig. 4 is an end view of the controlling lever and parts directly connected thereto.

Throughout the following detail description and on the several figures of the drawings similar parts are referred to by like reference characters.

Referring to the drawings for a specific description of the mechanism, the numeral 10 indicates what may be regarded as a power or driving shaft having a hollow hub or journal 11. The driven shaft 12 is in alinement with the driving shaft and has its end 13 journaled for rotation in the aforesaid hub 11. Said shafts may be mounted in any suitable bearings, represented diagrammatically at 14. A counter shaft 15, journaled in bearings 16, is located parallel to the axis of the aforesaid shafts, and is adapted to be rotated continuously from the power shaft 10 by virtue of a pair of gears 17 and 18 fixed respectively to the power and counter shafts. The foregoing specific description of the shafts will be understood as being for the sake of convenience of this specification only, and that any one of the shafts may for certain purposes be regarded as the motor or driving shaft, without departing from the spirit of the invention. The gear 17 is provided with a series of clutch teeth 19 having beveled ends, and mounted slidably and non-rotatably upon the shaft 12 is a gear 20 having a series of clutch teeth 21 of the same character as the teeth 19 with which they are adapted to engage when the gear is moved toward the gear 17. The gear 20 is provided also with a flanged collar 24 for the accommodation of a yoke whereby the gear 20 may be either moved toward or from the gear 17 or held spaced therefrom.

When it is desired to operate the shaft 12 in unison with the shaft 10 direct connection between the same will be effected by moving the gear 20 toward the gear 17, bringing the clutch teeth 21 and 19 into operative engagement. When a slower speed of the shaft 12 is desired than is realized under the direct connection with the power shaft the following devices are employed: Upon the counter shaft 15 is rigidly connected a collar 25 having on one side a series of peculiarly formed clutch teeth 26. Each of said teeth is provided with an angularly formed recess $a$ on its outer end, one of the walls of which is substantially parallel to the front surface of the tooth and the other wall of which is preferably at right angles thereto. A gear 22 is mounted on the counter shaft 15 between the collar 25 and gear 18, the gear 22 being mounted for free rotation and slidable movement and is provided on one face with a series of clutch teeth 23 similar to the aforesaid clutch teeth 26, with which they are adapted to engage, and said gear 22 is also provided with a yoke collar 24'. The gears 20 and 22 are in constant mesh and are adapted by peculiar shifting mechanism, hereinbelow described, to be moved simultaneously on their respective shafts or to be held so that the clutches so far described will be in engagement. As viewed in Fig. 1 when the gears 20 and 22 are shifted to the left and there held the shaft 12 will be driven in the same direction as the shaft 10 but at a slower speed, the power being transmitted through gears 17 and 19, countershaft 15, collar 25, clutch teeth 26 and 23, and gears 22 and 20. The collar 25 is also provided with a second series of clutch teeth 26', similar to the clutch teeth 26, which are adapted to coöperate with a similar set of clutch teeth 30 on the adjacent face of a gear 29 loosely and slidably mounted on the counter shaft and in constant mesh with a gear 27 slidably and non-rotatably mounted on the shaft 12. The gears 27 and 29 are provided with yoke collars 31 and 31' respectively whereby they may be shifted in unison toward or from the collar 25 or held from movement on their respective supports. When it is desired to operate the driven shaft at a still slower speed than heretofore contemplated, the gears 20 and 22 will be held in their neutral position, shown in Fig. 1, and the gears 27 and 29 will be shifted toward the right in said figure bringing the clutch teeth 30 and 26' into engagement so that the power will be transmitted from the shaft 10 through gears 17 and 18, counter shaft 15, collar 25, clutch teeth 26' and 30, and gears 29 and 27, rotating the shaft 12 at the slowest speed in the direction of the power shaft.

As is customary in transmission gearing of the type to which this invention relates it is desirable to provide a slow speed in the reverse direction. To this end I mount loosely and non-slidably on shaft 12 a gear 32, which may correspond in size to the slow speed gear 27 above described. A pinion 36 is fixed upon the counter shaft 15, said pinion being spaced from the gear 32, but from which pinion the said gear will be rotated by an intermediate idler gear 34 mounted upon any convenient support 35. The gear 27 is provided with a series of clutch teeth 28, similar to those described, and adapted to engage a set of similar clutch teeth 33 on the adjacent face of the gear 32. When the reverse operation is desired the gears 27 and 29 are shifted to the left as viewed in Fig. 1 so as to bring the clutch teeth 28 and 35 into interlocking engagement. The power will then be transmitted from the shaft 10 through gears 17 and 18, counter shaft 15, gears 36, 34, and 32, clutch teeth 33 and 28, and gear 27, driving the shaft 12 at a slow speed in the direction reverse to the shaft 10.

The peculiar shape of clutch teeth on the parts pertaining to the counter shaft constitutes a distinct advantage over the ordinary forms of clutch teeth for the purpose of facilitating engagement when the part to be driven may be temporarily operated at a higher speed than the driving element, the peculiar form providing an unusual amount of clearance to allow the parts to enter to the shoulders of the recesses $a$ even when the difference in speed of rotation may be considerable and whereby effective interlocking engagement for operation at the desired speed may be accomplished much easier and quicker than has heretofore been possible.

As was heretofore premised peculiar shifting mechanism must be provided whereby no more than one pair of clutch teeth may be in engagement at one time, all the others being held neutral or out of engagement. In order to accomplish this with the least possible mechanism and to provide a construction which is simple and compact, insuring that the mechanism will be the least likely to become out of order and to occupy the least possible space, I provide a pair of yoke sleeves 38 and 40, mounted slidably upon a pair of parallel rods or guides 37 and 37' respectively located adjacent and parallel to the aforesaid power shafts and as close thereto as the size of the gears will permit. The sleeve 38 is provided with a pair of yokes 39 and 39' which are in constant engagement with the collars 24 and 24' respectively of the gears 20 and 22. The sleeve 40 has a corresponding pair of yokes 41 and 41' having constant engagement with the collars 31 and 31' respectively of the gears 27 and 29. The sleeves 38 and 40 are furthermore provided with a pair of lugs or projections 42 and 43 respectively, said lugs having notches or sockets 44 which are in alinement as shown in Figs. 2 and 3 when the gears are all in the neutral position indicated in Fig. 1. In order to shift either of the sleeves 38 or 40 in either direction along its rod while the other is held in its neutral position, I provide a rock shaft 45, suitably journaled in a casing A and bearing 46, and secure to said rock shaft a finger 50, said finger being adapted to span the space between the sockets 44 of both of said lugs 42 and 43 or to operate in either of them alone, depending upon the longitudinal position of the rock shaft 45 in its bearings, the shaft being adapted either to normally occupy the mid position indicated in Fig. 2 or to be moved either toward the right or toward the left from said mid position. When the shaft is moved inwardly or toward the right the finger 50 will engage the lug 43 alone and when moved toward the left it will engage the lug 42 alone so that by rotating the rock shaft 45 after being thus shifted longitudinally one of the sleeves will be shifted longitudinally of its support in the direction corresponding to the direction of rotation of the shaft 45 and hence bringing the desired pair of clutches into operation and holding the other pair of the same set out of operation. In order to prevent the other sleeve from sliding on its support I provide a locking yoke 51 of peculiar compact construction. Said yoke comprises a pair of parallel legs 51' having feet 51" in alinement with each other and with the operative end of the finger 50 when the parts are in their normal neutral position. One of said feet 51" is provided with a lateral projection 52 slidably mounted in the wall of the casing A in such a manner as to prevent rotation of the yoke 51. Said yoke is loosely mounted upon the shaft 45 and embraces the finger 50, the legs 51' of the yoke being rigidly connected by a bridge 51$^a$. The yoke will therefore be shifted longitudinally with the shaft 45 but is held from rotation with respect to the shaft and finger 50. When the shaft and finger are shifted longitudinally preparatory to shifting one of the sleeves 38 or 40 as the finger 50 comes into sole engagement with the lug 42 or 43 the corresponding foot 51″ will have passed beyond said lug leaving it free to be moved by the finger, the other of said lugs being held by the other foot 51″ of the yoke from longitudinal movement. The construction and arrangement of these several parts are such that the rock shaft can not be rotated when in its neutral position for the reason that the finger 50 will engage both of the lugs 42 and 43 which are held from movement by the yoke 51, and furthermore after one of the sleeves has been shifted in the manner above set forth it must be brought back to neutral position before any further change of speed may be effected. The rock shaft 45 is provided with a fixed collar 53, between which and the supports for the shaft are arranged a pair of springs 54, tending normally to hold the shaft in its neutral position.

A pivot block 47 is loosely mounted upon the shaft 45 adjacent the outer end of the bearing 46 and to which is pivoted a single operating lever 48, whereby when the lever is moved to the right or left on its pivot pin 47′, as viewed in Fig. 2, the shaft 45 will be moved longitudinally to the right or left preparatory to the shifting of one or the other of the sleeves 40 or 38. The connection between the lever 48 and said shaft 45 is effected by means of a curved arm 49 rigidly connected at one end to the shaft and loosely connected at its other end to the lever at 49′. The lever is operative to rotate the rock shaft 45 in either of its positions to which it may be moved on its pivot 47′.

I claim:

1. In change speed gearing, the combination of a driving shaft, a driven shaft, a counter shaft, means whereby the counter shaft is constantly driven from the driving shaft, a plurality of gears slidably and non-rotatably mounted on the driven shaft, a plurality of gears meshing with the aforesaid gears and loosely and slidably mounted on said counter shaft, means whereby either of the said counter shaft gears may be connected to the counter shaft to be driven therefrom, and means to hold said other counter shaft gear free from operation by the counter shaft.

2. In change speed gearing, the combination of a driving shaft, a driven shaft, a counter shaft, means to drive the counter shaft continuously from the driving shaft, a clutch collar rigidly connected to the counter shaft, a pair of gears mounted loosely and slidably on the counter shaft on opposite sides of said collar, each of said gears having a series of clutch teeth adapted to engage with the clutch teeth of said collar, a pair of gears slidably and non-rotatably mounted on said driven shaft, the latter pair of gears being in constant mesh each to each with said counter shaft gears, means to slide either meshing pair of gears simultaneously so as to effect engagement thereof with said clutch collar, and means to hold the other meshing pair of gears free from said collar.

3. In change speed gearing, the combination of a driving shaft, a hollow hub secured thereto, a driven shaft in alinement with the driving shaft and journaled in said hub, a counter shaft, means to constantly drive the counter shaft from said hub, a pinion fixed to the counter shaft, a pair of gears loosely and slidably mounted upon the counter shaft, means whereby either of said gears may be driven from the counter shaft, a pair of gears slidably and non-rotatably mounted upon the driven shaft and meshing with the counter shaft gears each to each, means to hold said pairs of meshing gears out of engagement with the counter shaft gear driving means, means to connect one of the driven shaft gears for direct operation from said driving shaft hub, a gear rotatably mounted on the driven shaft, means to connect the other of said driven shaft slidable gears with the rotatable gear, and means to drive said rotatable gear from said counter shaft pinion, substantially as set forth.

4. In change speed mechanism, the combination of a continuously rotating shaft, a clutch collar fixed thereto, said clutch collar having clutch teeth on opposite sides thereof, the ends of said teeth being provided with angular recesses, a pair of different sized gears loosely and slidably mounted on said shaft, each of said gears having clutch teeth directed toward and similar to the clutch teeth of said collar, a driven shaft, a pair of different sized gears slidably mounted on said driven shaft and in constant mesh with the aforesaid gears in reverse order, and means to slide the aforesaid pairs of meshing gears toward or from said clutch collar for the purpose either of disengaging both or for engagement of one pair while the other is held free from said clutch collar.

5. In change speed mechanism, the combination of a double clutch collar, the teeth of which are each provided with an end socket, means for driving said clutch collar constantly in a certain direction, a pair of different sized gears mounted loosely for movement toward or from said clutch collar, each of said gears having clutch teeth directed toward and similar to the aforesaid clutch teeth, a driven shaft, a pair of different sized gears mounted slidably upon the driven shaft and meshing severally with the aforesaid different sized gears in reverse order, means for shifting the pair of meshing gears of higher speed away from said clutch collar and to shift the other of said pair of meshing gears into engagement with said clutch collar, said means constituting also means to hold the non-engaging pair of gears out of engagement with the clutch collar.

6. In change speed mechanism, the combination of a driving shaft, a driven shaft, a counter shaft, means to drive the counter shaft constantly from the driving shaft, a clutch collar fixed upon the counter shaft, a pair of gears loosely mounted upon the counter shaft on opposite sides of the clutch collar, a pair of gears slidably mounted upon the driven shaft and meshing each to each with the counter shaft gears, a pair of sleeves slidable parallel to the aforesaid shafts, each of said sleeves having a pair of yokes in constant operative engagement with a meshing pair of said gears, and means to slide either of said sleeves and its gears into or out of engagement with said clutch collar, said means also serving to hold the other of said sleeves and its related gears from said collar.

7. In change speed mechanism, the combination of a driving shaft, a driven shaft, a counter shaft, means to drive the counter shaft from the driving shaft, a pair of gears slidably mounted on the counter shaft, means to drive either of said gears from the counter shaft, a pair of gears slidably mounted on the driven shaft and meshing constantly each to each with the counter shaft gears, means to slide either pair of meshing gears into or out of engagement with the counter shaft driving means and to hold the other pair of meshing gears free from the counter shaft driving means, said gear sliding means including pairs of yokes in constant engagement with the respective pairs of meshing gears, and a single operating lever to control said pairs of yokes.

8. In change speed mechanism, the combination with pairs of slidable gears having clutch collars, of a pair of yoke members each having a pair of yokes in constant engagement with a pair of said clutch collars, said yoke members having lugs with sockets adapted to aline with each other, a rock shaft parallel to said sockets, a finger secured to the rock shaft and extending into said sockets, a locking yoke mounted loosely upon the rock shaft and embracing said finger, said yoke having feet coextensive with said finger and adapted to register therewith in normal position, means to prevent the locking yoke from rotation, and means to slide the rock shaft, finger, and locking yoke longitudinally with respect to the aforesaid yoke members.

9. In change speed mechanism, the combination with pairs of constantly meshing slidable gears, of sliding mechanism comprising a pair of yoke members, each of said members having a pair of yokes in constant engagement with the corresponding pair of meshing gears, said yoke members being also provided with a pair of lugs having notches disposed transversely to the direction of movement of the yoke members and adapted to aline with each other in normal position, a rock shaft, said rock shaft being longitudinally movable and rotatable on an axis parallel to said lug sockets, means to restrain the rock shaft normally from endwise movement, a finger secured to the rock shaft and adapted to extend into the aforesaid sockets, whereby either of said yoke members may be shifted upon rotation of the rock shaft, and means associated with the rock shaft to prevent shifting of the other yoke member while the former is being shifted.

In testimony whereof I have hereunto affixed my signature in the presence of two witnesses.

CHARLES COTTA.

Witnesses:
BERTHA R. KEAL,
E. M. ST. JOHN.